Patented Dec. 29, 1936

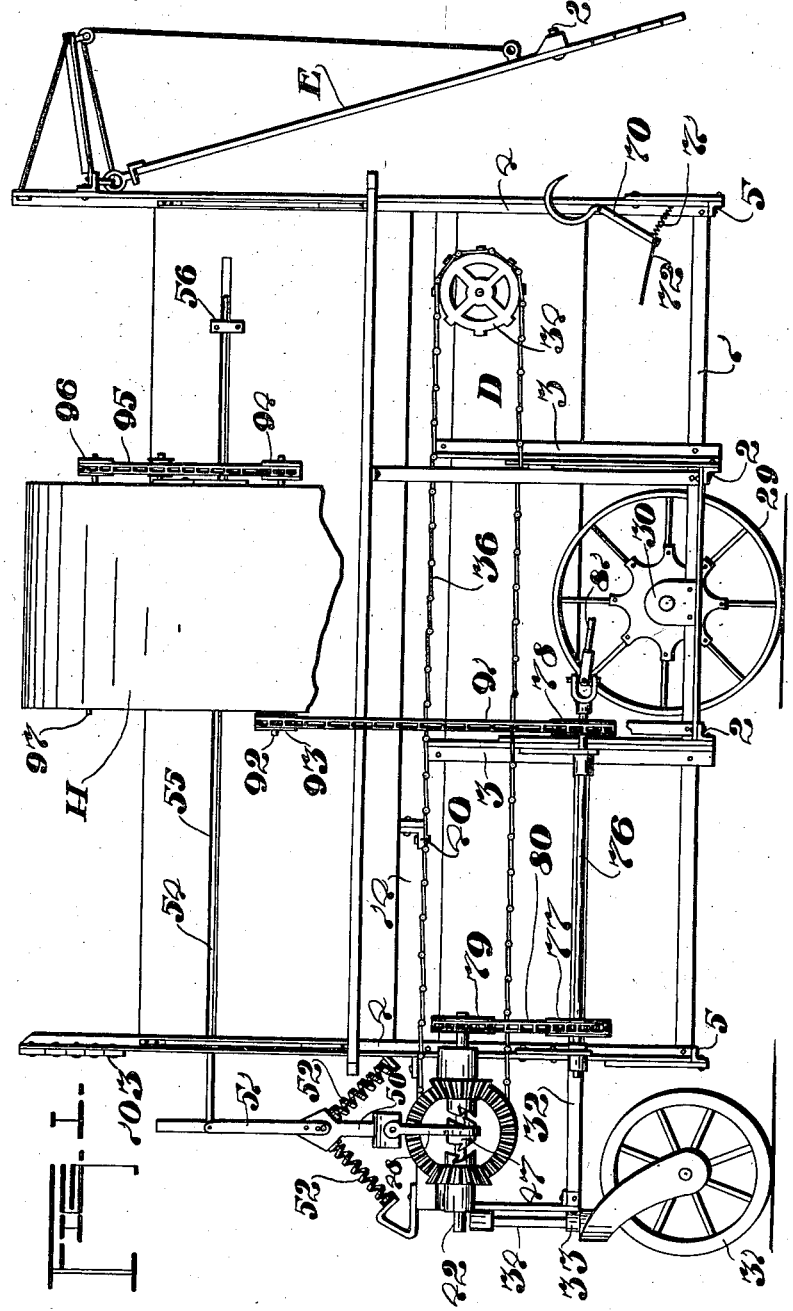

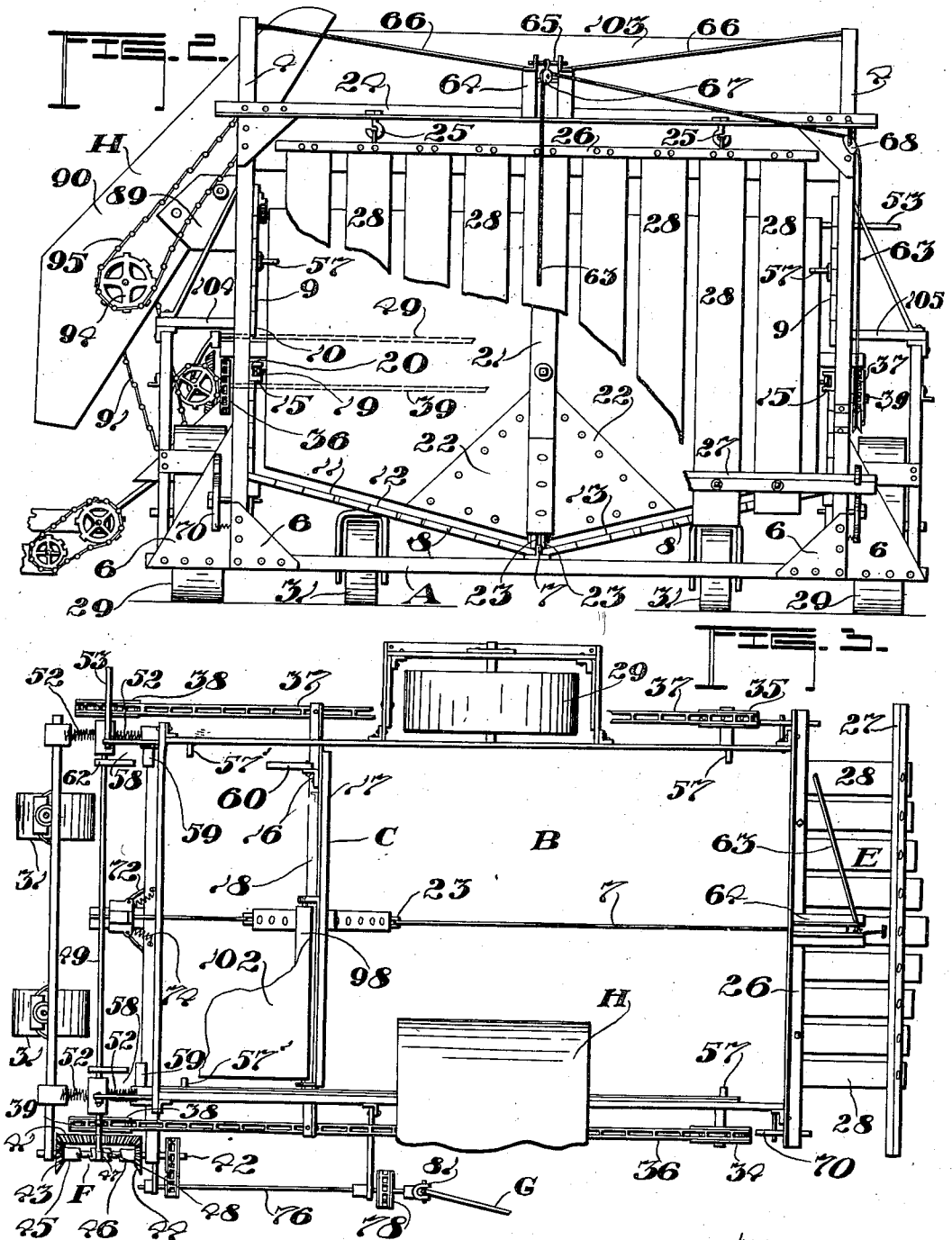

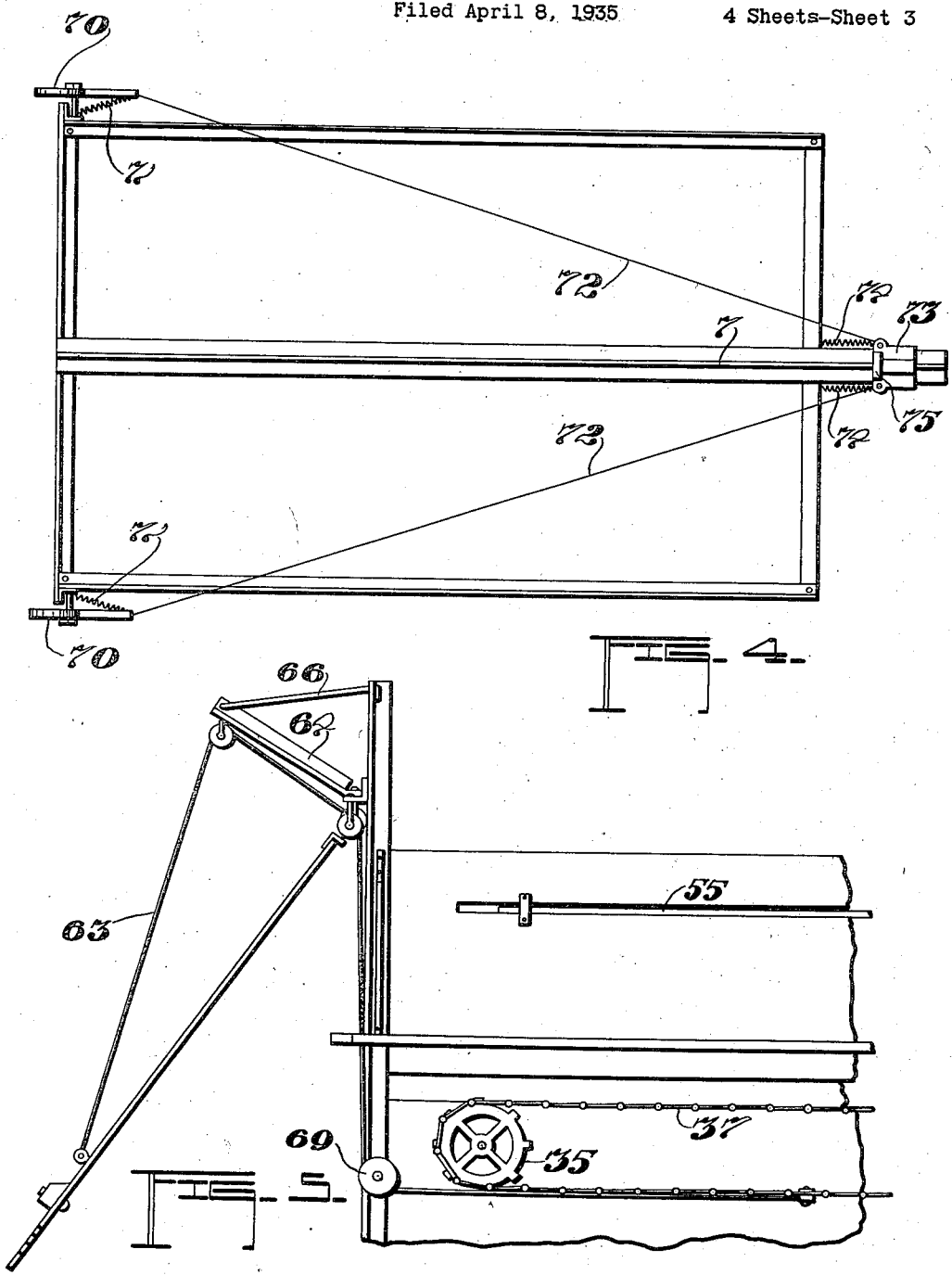

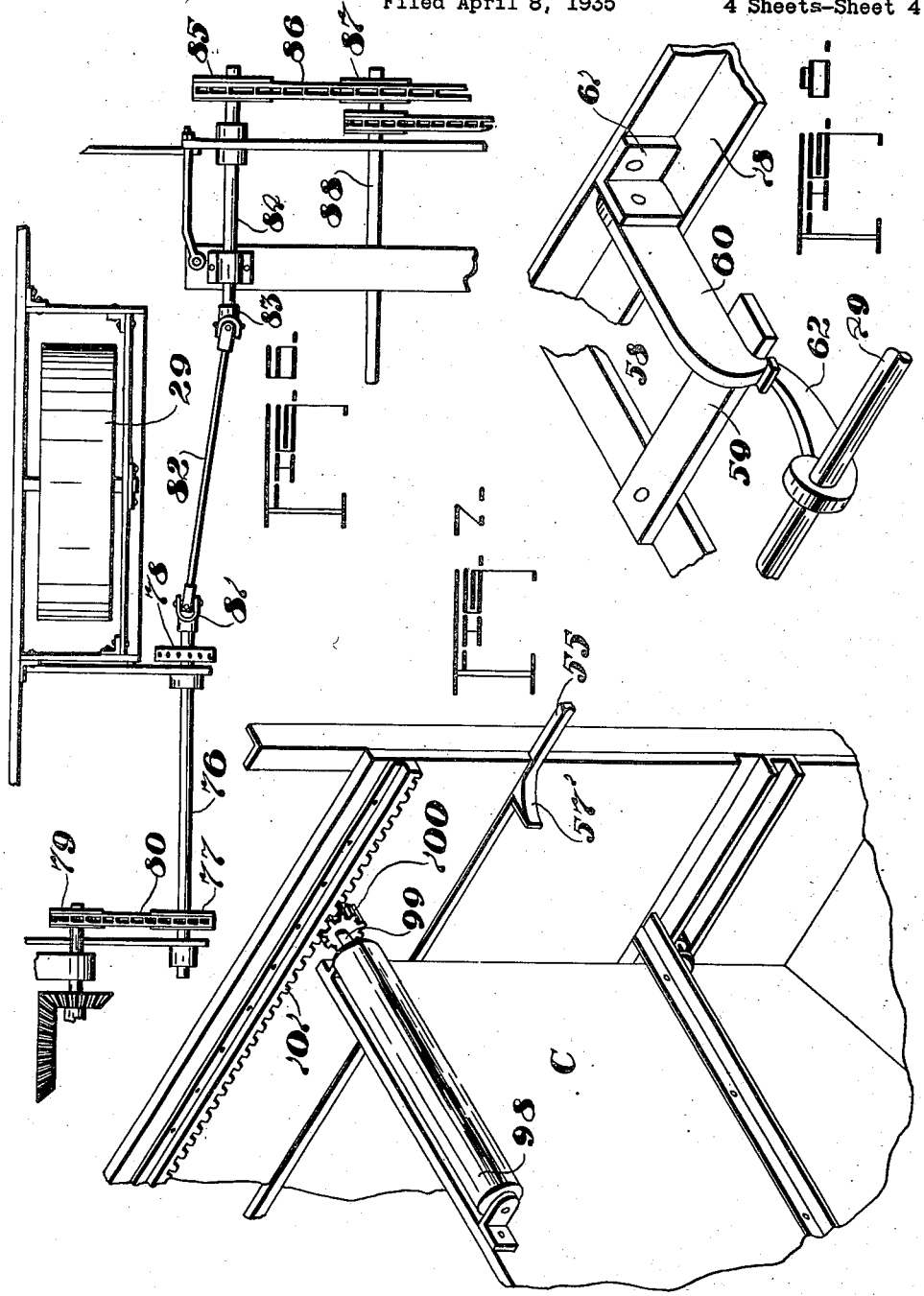

2,065,973

UNITED STATES PATENT OFFICE 2,065,973

GRAIN STACKING BARGE

William L. M. Jones, Winnipeg, Manitoba, Canada, assignor to Penn, Olson and Company, Winnipeg, Manitoba, Canada Application April 8, 1935, Serial No. 15,327

11 Claims. (Cl. 214—82)

This invention relates to improvements in harvesting machines and an object of the invention is to provide a machine of this character for use with a binder or reaping machine and attachable thereto into which cut grain may be deposited and stacked, the stack being periodically dumped as the harvesting machine and associated binder or reaping machine move forwardly over the acreage to be cut.

A further object of my invention is to provide a harvesting machine which will periodically dump a stack of grain by rearwardly pushing said stack out of a stack-forming barge, the roof of said stack being slanted upwardly towards the middle to shed moisture falling thereupon.

A further object of my invention is to provide a harvesting machine which may be easily and simply attachable to any make of binder, reaping machine, etc., and either driven by said binder, reaping machine, etc., or by a tractor.

A further object of my invention is to provide a harvesting machine of this character which may be easily assembled and economically manufactured.

A further object of my harvesting machine is to provide means of stacking grain thereby obviating the necessity for binding the grain into sheaves thus rendering the use of binder twine unnecessary.

A further object if my invention is to eliminate the necessity for stooking or stacking harvested grain.

A further object of my invention is to form cut grain into stacks in which the grain kernels will be free from the scorching effect of the sun and the germinating effect of rain, and in which it may sweat gently, and thereby be subjected to a natural curing process.

A further object of my invention is to provide a grain stacking barge which by forming the grain into stacks eliminates the repeated handling which necessarily takes place when a crop of grain is stooked, in this way avoiding the considerable loss of grain due to the inevitable rattling and shaking loose of grain when it is subjected to considerable handling.

A further object of my invention is to provide a grain stacking barge which will deposit a stack of grain having a water-shedding roof thus enabling the crop to be threshed at any time during the year if desired without deterioration of quality in the grain.

A further object of my invention is to provide a grain stacking barge which will form a cut crop into stacks which may be placed adjacent one another at any convenient location in a field thereby permitting fall plowing operations to take place, if desired, immediately after the grain is cut.

A further object of my invention is to provide a grain stacking barge of the character described which will not substantially increase the draft on the machine with which it is used.

With the foregoing objects in view and such other minor objects as may appear as the specification proceeds, my invention consists essentially in the arrangement and construction of parts all as hereinafter more particularly described, reference being had to the accompanying drawings, in which:—

Figure 1 is a side view of my harvesting machine.

Figure 2 is a rear view of Figure 1.

Figure 3 is a plan view of Figure 1.

Figure 4 is a plan view of the underside of my harvesting machine.

Figure 5 is a detail showing the gate lifting mechanism.

Figure 6 is a plan view showing the drive mechanism of my harvesting machine.

Figure 7 is a perspective detail showing a portion of the interior of the barge of my harvesting machine, a portion of the ramming shield thereof, and the roller attached thereto.

Figure 8 is a perspective detail showing my ramming shield tripping mechanism.

In the drawings like characters of reference indicate corresponding parts in the different figures.

My invention consists of a framework generally designated as letter A. Within the framework, and attached thereto, is my barge B. Slidable forwardly and rearwardly within the barge is a vertical ramming shield C, the shield being moveable forwardly and rearwardly by the action of a sprocket chain and wheel assembly generally designated by the letter D, while at the rear of the barge is a hinged gate E. At the forward side of the frame is my clutch assembly F, and co-acting between the clutch assembly and the binder, is my drive mechanism G, this drive mechanism also actuating an elevating unit H whereby cut grain is elevated from the binder into the barge B.

The framework of my invention consists of longitudinal channels or angles 1 at the lower corners thereof, and lateral channel members 2 extending between the members 1, and beneath the barge. Verticals 3 are mounted upon the members 1 at various points medially thereof, the corner posts 4 extending to a considerable height in comparison with the members 3. The front and rear-end laterals 5 preferably extend beyond the junction of the members 4, being suitably braced thereto by means of fish plates 6.

Extending longitudinally midway between the laterals 2 and 5, I provide a T bar 7, and extending between this T bar and to a point medially upon the length of the verticals 3 and 4, I provide diagonals 8, for bracing the floor of my barge B.

The side walls 9, of my barge are formed of boards 10, extending longitudinally side by side, and attached to the verticals 3 and 4. The floor 11, of my barge also consists of boards 8 which extend longitudinally side by side between the walls to form two inwardly and downwardly inclined surfaces 12 and 13, meeting at the T bar 7.

Upon the side walls 9, of my barge, I provide a horizontal slot 14, running the full length of the barge, and running adjacent this slot, upon the lower edge thereof, I provide an inwardly turned channel 15, within which my ramming shield C moves.

My ramming shield may consist of a pair of vertical angle bars 16, adjacent either end thereof, and boards 17 extending horizontally between these members.

I also provide a lateral angle bar 18 which extends across the shield and through the slot 14, for a purpose later to be described. Below the lateral 18, and upon either vertical side of the shield, I provide rollers 19, suitably mounted in bearings, these rollers running in the tracks 20, formed in the channels 15. Thus it will be seen that my shield is free to move forwardly and rearwardly within the barge.

I might also mention that my shield is suitably braced by a central vertical 21, and with fish plates 22 which are riveted to this member and reinforce the boards which compose the body of the shield. Finally, in order to make the shield run as smoothly as possible, and to assist in preventing any twisting motion, I provide guides 23, which extend upon either side of the web of the T bar 7.

Towards the upper end of my rear corner verticals 4, I provide a lateral bracing and gate suspending channel bar 24, this member being provided with a pair of hooks 25 upon which hangs the gate E. This gate consists of an upper frame member 26, and a lower frame member 27, which extends somewhat beyond the confines of the door, and vertically disposed spaced boards 28 extending between the members 26 and 27.

The arrangement of my machine is such that by operating the clutch mechanism F, shortly to be described, the shield is made to move rearwardly simultaneously with the raising of the gate E to discharge the contents of the barge, the ramming shield being returned to its forward position when the stack is being discharged, and the gate being simultaneously lowered as soon as the stack has been discharged.

Thus it will be seen that the ramming shield forms the front wall of my barge, while the gate E normally forms the rear wall thereof.

Before proceeding to describe the mechanism by which my shield and gate are actuated, I would mention that my frame is suitably mounted upon a pair of wheels 29 journalled in boxes 30, upon the frame members 1, and by a pair of pony wheels 31 mounted to an extension 32 of the frame, these wheels being pivoted as at 33 upon a shaft 34 so that the harvesting machine may be steered to right or left.

Upon the outer side of each of the side walls 9 of my barge, at the rear thereof, are mounted sprocket wheels 34 and 35, and around these wheels I pass longitudinally extending sprocket chains 36 and 37, these sprocket chains extending around further sprocket wheels 38, mounted upon a transverse shaft 39 suitably journalled in bearings upon the forward side of the frame. The sprocket chains 36 and 37 aforementioned, are suitably clipped at 40 to the extending ends of the member 18, extending across the shield, so that as the sprocket chains move the shield will be also moved forwards or backwards.

At the extremity of the shaft 39, I provide a bevelled crown pinion 41, which is keyed to said shaft and extending perpendicularly and horizontally with respect to the shaft I provide a spindle 42 this spindle being suitably journalled at each end to the framework of my machine as clearly shown.

Freely mounted upon the shaft in engagement with the teeth of the crown pinion 41, I provide two further bevelled pinions 43 and 44. These pinions are provided with inwardly extending sleeves 45 and 46 which are ratcheted in the manner shown, and slidably keyed to the shaft and rotatable therewith, I provide a clutch member 47 which may be slid into engagement with either of the ratcheted sleeves.

An annular recess is formed centrally upon the periphery of the clutch member 47, and into this recess extends the bifurcated ends of an arm 48. This arm is pivoted to a rod 49 extending across the front of my machine directly above the shaft 39.

Also pivoted upon the shaft 49 at each end thereof is a vetrical extension 50, above which extends a vertical lever arm 51, and extending diagonally from the apex of the extension 50 I provide two pairs of coil springs 52, which are suitably attached by their lower ends to the frame, these springs being for the purpose of keeping the extension 50 and the lever arm 51 normally in a vertical position.

It should be mentioned, however, that upon the right-hand side of the barge, the lever arm 51 is provided with a horizontally lying extension 53 for operation by the controller of the machine.

Pivoted and extending rearwardly from the apex of each of the lever arms 51, I provide rods 54, these rods running in longitudinal slots 55 formed in the side walls of the barge. These rods are suitably maintained in position as by means of the braces 56, and are provided at their rear ends with inturned portions 57. Adjacent their forward ends they are provided with inturned brackets 57' most clearly shown in the perspective Figure 7, and in plan view Figure 3.

Upon the front face of the ramming shield C, and upon the channel 18, I provide retaining means 58, most clearly illustrated in Figure 8, for the purpose of retaining the ramming shield in its forward position when the barge is travelling uphill. This consists of a bracket 59 mounted upon one of the side members of the frame, which is engaged by the dog 60, this dog being pivotally held as by means of the angle bracket 61 secured to the angle bar 18. This dog is provided with a cam face so that when the ramming shield is returning to its forward position it will ride over the bracket 59, and hook into the position shown in Figure 8. When the clutch is actuated, however, a trip 62 keyed to the shaft 49 rotates upwardly and disengages the dog from the bracket. It should be mentioned that this arrangement is provided upon either side of the ramming shield.

Referring now to the means whereby the gate is raised or lowered in synchronization with the rearward and return movement of my ramming shield, it will be observed that I provide a pulling line 63 having one end secured adjacent the free lower end of my gate, and the other clipped to my sprocket chain 37. Located centrally upon the member 24 upon which the gate hangs, I provide a cantilever unit 64 consisting of two channel members having a pin 65 extending through eyes at the end thereof, this cantilever being suitably braced to the main frame of the tie rods 66.

Suspended upon the pin 65 is a pulley block 67, and upon one end of the member 24 is a second pulley block 68, the line 63 passing through these pulley blocks and downwardly over the pulley 69 mounted upon one of the rear vehicles of the main frame in horizontal alignment with the lower side of the sprocket chain 37.

From the foregoing description it will be seen by referring preferably to Figure 5, that when the chain moves in a counter-clockwise direction, the gate will be lifted towards the horizontal.

Upon the rear corner verticals 4 of the framework of my machine, I pivotally mount grab hooks 70, the lever arms of these grab hooks being connected to coiled compression springs 71, the opposite ends of which are secured to the verticals 4. The purpose of these grab hooks is to catch the extending ends of the horizontal bar 27 extending across the lower side of the gate. A line 72, most clearly shown in plan view in Figure 4, is attached to the lower end of each of the lever arms of these grab hooks, and passes under the floor of the barge to converge inwardly to the front end thereof where it is caught upon a sliding element 73 mounted upon the T bar 7 forming the central support for the floor of the barge. Coiled springs 74 extend between the element 73 and are suitably secured to one of the laterals of the framework, the element 73, being provided with an upstanding abutment 75 against which the ramming shield strikes when it is returning to its forward position. When the ramming shield strikes the abutment and the element in this manner, the grab hooks are lowered and catch the ends of the bar 27 upon the gate.

The drive mechanism which co-acts between the clutch mechanism described and the source of power in the form of a binder, tractor, etc., consists of a horizontally-lying shaft 76 suitably journalled upon the side of the frame of the barge. Upon this shaft is a sprocket wheel 77 adjacent the forward end thereof, and a sprocket wheel 78 adjacent the rear thereof. Above this sprocket wheel 77, and upon the end of the shaft 42, I mount a third sprocket 79, the sprockets 77 and 79 being united by a sprocket chain 80, the end of the shaft 76 being provided with a universal joint 81 connecting it to a second shaft 82, this arrangement being most clearly shown in plan in Figure 6. At the end of the shaft 82 is a second universal joint 83, and to this universal joint a third shaft 84 suitably journalled upon a binder to which my harvesting machine is hitched. The rear end of the shaft 84 is provided with a sprocket wheel 85 which engages by means of a sprocket chain 86 a further sprocket 87. This sprocket is mounted upon a shaft 88 to which is connected a power take-off leading to a tractor.

If the motive power for the actuation of my ramming shield is to be obtained from the bull wheel of a binder, the mechanism as from the universal joint 81 will be modified.

In some cases, I may elect to actuate my ramming shield by means of a stationary engine mounted along side the harvesting machine, and in this case the engine will be suitably connected to the shaft 76.

Attached to the frame of my machine by means of fish plates 89, is a grain elevator housing 90, within which is a grain elevator of the usual construction, and consisting preferably of an endless band of canvas having the usual slats riveted thereacross to elevate grain, prongs being mounted upon the slats.

The elevator belt within the casing 90 is actuated by means of a sprocket chain 91, which engages with the sprocket 78, on the shaft 76, the roller shaft 92, being provided with a sprocket wheel 93, which also engages with the sprocket chain 91. The opposite end of the roller shaft is also provided with a further sprocket 94, around which passes a sprocket chain 95, to engage with a further sprocket wheel 96 keyed to the top roller shaft 97. In this way it will clearly be seen that grain may be elevated and dumped into the interior of my barge.

In Figure 7, I have illustrated a roller 98, suitably mounted along the top edge, and upon the near side of my ramming shield, at the front thereof, the roller shaft 99, for this member, being provided with a keyed pinion 100. This pinion engages with a rack 101, which extends along the interior upper edge of the near side wall of my barge. A canvas belt 102, shown upon Figure 3, will be secured to this roller and windable thereupon, the opposite end of the belt being suitably attached in substantially the same horizontal plane as the roller to the lower edge of a wind screen 103, extending above and across the forward end of my stacking barge, this screen being for the purpose of assisting to prevent grain from being blown about as it emerges from the elevator unit H, and falls into the interior of the barge.

Figure 7 being a perspective view taken from the forward end of my barge, it will be apparent that when the ramming shield is moving towards the front of the barge, the canvas belt will wind upon the roller 98, and when moving towards the rear thereof will unwind. In this way it forms a platform or tray upon which grain will fall from the upper open end of the elevator casing 90, when a stack is being dumped from the interior of the barge by virtue of the ramming shield moving rearwardly.

Since grain is being delivered continuously, it will be apparent that without some provision for taking care of grain delivered while the dumping process is being carried out, it would simply fall to the forward side of the ramming shield, this being obviously undesirable. As the belt winds during the return travel of the ramming shield, it will clearly be seen that any grain thereupon will fall into the interior of the barge to the rear of the ramming shield.

I would finally mention that upon either side of my stacker, I provide platforms 104 and 105, suitably secured to the main frame, these being most clearly shown in Figure 2, to enable an operator, or operators, to arrange the grain as it falls into the barge, and also to operate the clutch actuating lever arm 53.

Having now described the structure of my in- vention, a description of its operation will now be given.

Assuming my machine to be attached to a binder drawn by a tractor which is rotating the shaft 88 by means of a power take-off connected thereto, the shaft 88 is rotated by which rotative movement is imparted through the sprocket wheel 87, and the chain 86, to the shaft 84, by means of the sprocket 85. In this way, motion is imparted to the universally jointed shaft 82, and the shaft 76. The rotation of the shaft 86 causes rotation of the sprocket 78, which in turn actuates the chain 91. This chain causes the elevating belt within the elevator housing 90 to travel upwardly upon its outer face, thereby precipitating grain cut by a binder into the stacking barge B.

An operator will be mounted upon the platform 105, and will arrange the grain falling into the barge so that the heads all point inwardly, and he will bond the grain in such a way that there will be no possibility of the stack halving after it is deposited from the barge. When the barge is full, the operator will pull the lever 53, by which action the clutch 47 will be slid along the shaft 42, from a neutral position between the sleeves 45 and 46 to engage with ratcheted sleeve 45.

It will be apparent that as the clutch 47 is slidably keyed to the shaft 42, and as the shaft 42 is in keyed sprocketed engagement with the shaft 76, it will constantly rotate thereupon so long as power is being applied. Bevelled pinions, however, as previously mentioned, are freely mounted upon the shaft 42, so that when the clutch engages the ratcheted end of the sleeve 45, the bevelled pinion 43 is rotated, this in turn imparting motion to the crown bevelled pinion 41. As this pinion is keyed to the shaft 39, it will rotate same, and in so doing, will actuate the sprockets 38, which are also keyed thereto.

In this way the sprocket chains 36 and 37 will be rotated, and as these sprocket chains are clipped to the ends of the cross member 18, upon the rearwardly moving upper side thereof, the ramming shield will be forced rearwardly to discharge the stack.

Simultaneously, with the rearward movement of the ramming shield, the gate E is lifted by means of the pulling line 63 the end of which is also clipped to one of the sprocket chains, but upon the forwardly moving underside thereof. When the ramming shield has reached its rearmost position, the gate is raised to the horizontal, and the stack will be precipitated to the ground.

It should be mentioned that when the lever 53 is thrown, to cause the clutch 47 to engage with the sleeve 45, the trip 62, upon the shaft 49, releases the dog 60, from the projection 59, and that as the shield commences to move rearwardly, the element 73 is released by the contraction of the spring 74, and travels a short distance rearwardly upon the T bar 7. In this way, the lines 72 are slackened, thereby enabling the springs 71 attached to the lever arm of the grab hooks 70, to retract and disengage the grab hooks from the ends of the bar 27.

It will also be apparent, that when the shield commences to move rearwardly, the belt 102, upon the roller 98, will commence to unroll to form a temporary platform for grain discharged from the upper orifices of the elevating system H, during the travel of the ramming shield.

When the ramming shield has moved rearwardly to its limit, it strikes the projections 57' extending into the barge upon either side thereof, and by this means, returns the arm 51 to the vertical postion, this action causing the clutch to return to its neutral position between the sleeves 45 and 46.

The operator will now throw the lever arm 53 forwardly, thereby engaging the clutch with the ratcheted sleeve 46. By this means, the sprocket chains 36 and 37 will reverse direction, and the ramming shield will move forwardly again. As it moves forwardly, the gate will obviously be lowered, and the belt 102, will commence to wind, depositing grain lying thereupon into the barge during this process.

When the ramming shield reaches its forward limit it will strike the projections 57', mounted upon the shaft 54, in this way again causing the arm 51 to return to the vertical, and shift the clutch into neutral. Just prior to the point where the ramming shield strikes the projections 57', it will strike the element 73, which will be forced forwardly and tighten the lines 72. By this tightening action, the grab hooks 70, will be lowered, and engage with the ends of the bar 27, thus clamping the gate E against the rear edges of the vertical walls of the barge.

As the ramming shield returns to its extreme forward position, it will also be noted that the arcuate under portion of the arm of the dog 60, will engage with the projection 59, thus holding the ramming shield in its forward position until it is required that it should be moved rearwardly again.

Since various modifications can be made in the above invention, and many apparently widely different embodiments of same made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:—

1. A grain stacking barge having bounding walls and a floor therewithin, means for positively discharging the contents of said barge in the form of a stack consisting of a ramming member normally forming one wall of said barge, and movable forwardly and rearwardly therewithin, means for actuating said ramming member consisting of sprocket and chain mechanism extending upon the side of said stacking barge, drive means for actuating said sprocket and chain, elevating mechanism for discharging grain into the interior of said barge, means for receiving grain from said elevating mechanism during the process of discharging the contents of said barge, and a gate extending between the bounding walls of said barge synchronized for movement with the movement of said ramming member.

2. A grain stacking barge, having bounding walls and a floor therewithin, means for positively discharging the contents of said barge in the form of a stack, consisting of a ramming member normally forming one wall of said barge and movable over said floor, means for actuating said ramming member, clutch mechanism for engaging or disengaging said actuating mechanism with a source of power, a gate normally forming a second wall of said barge, said gate being synchronized for opening and closing movement with the movement of said ramming member, and means for preventing the lodging of grain between said ramming member and the front edge of said floor during the passage of said ramming member over said floor.

3. The device as claimed in claim 2 which includes tripping mechanism to reverse said clutch mechanism upon said ramming member reaching one end of its travel and return said ramming member to its normal position.

4. The device as claimed in claim 2 which includes tripping mechanism to reverse said clutch mechanism upon said ramming member reaching one end of its travel and return said ramming member to its normal position, and further tripping mechanism to disengage said clutch mechanism upon said ramming member returning to its normal position.

5. A grain stacking barge consisting of a chassis, a floor mounted upon said chassis, substantially vertical side walls extending along the side edges of said floor, a front wall mounted for forward and rearward movement over said floor between said side walls, said front wall being designed to act as a ramming member, means for actuating said front wall, a gate mounted upon the rear ends of said side walls synchronized for opening and closing movement with the rearward and forward movement of said front wall, elevating mechanism for discharging grain into the interior of said barge and means for preventing the discharge of grain into said barge during the rearward and forward movement of said front wall.

6. A grain stacking barge consisting of a framework mounted upon ground engaging wheels, a plurality of side walls and a rear gate extending therebetween, a floor extending between said side walls, said floor being spaced above the ground by the minimum practicable clearance, a ramming member mounted above said floor and between said side walls, said ramming member being movable rearwardly between the side walls to urge the contents of said barge onto the ground at the rear thereof, and means for opening said rear gate in synchronization with the rearward movement of said ramming member.

7. The device as claimed in claim 6 in which said ramming member is in the form of a partition normally constituting the front wall of said barge.

8. The device as claimed in claim 6 in which means are provided to automatically reverse the direction of movement of said ramming member between the side walls at the end of its rearward travel.

9. The device as claimed in claim 6 in which means are provided for intercepting the deposit of grain from an adjacent cutting and elevating implement into said barge during the operation of discharging the contents thereof.

10. In a grain stacking barge, means for intercepting the deposit of grain thereinto from an adjacent elevator consisting of a grain receiving surface movable during the act of discharging the contents of said barge to a position beneath the discharge aperture of said elevator.

11. In a grain stacking barge, means for intercepting the deposit of grain into said barge during the act of discharging the contents thereof consisting of a rollable grain receiving surface mounted in a substantially horizontal position above said barge.

WILLIAM L. M. JONES.